Feb. 15, 1927. 1,617,442
J. R. EAID
WHEEL
Filed Sept. 19, 1923   2 Sheets-Sheet 1
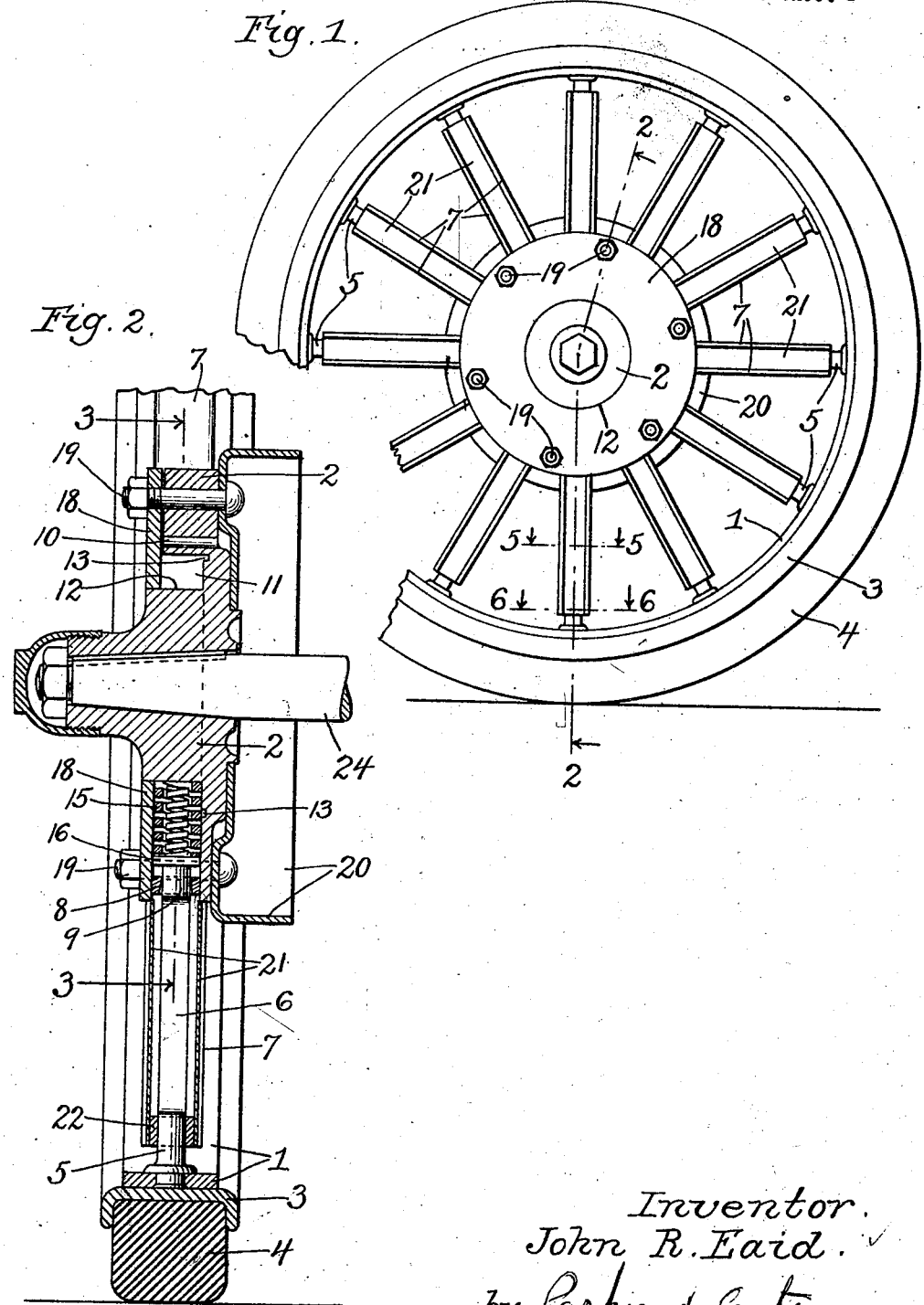
Inventor.
John R. Eaid.
by Parker & Carter
Attorneys.

Feb. 15, 1927.  
J. R. EAID  
1,617,442  
WHEEL  
Filed Sept. 19, 1923 2 Sheets-Sheet 2
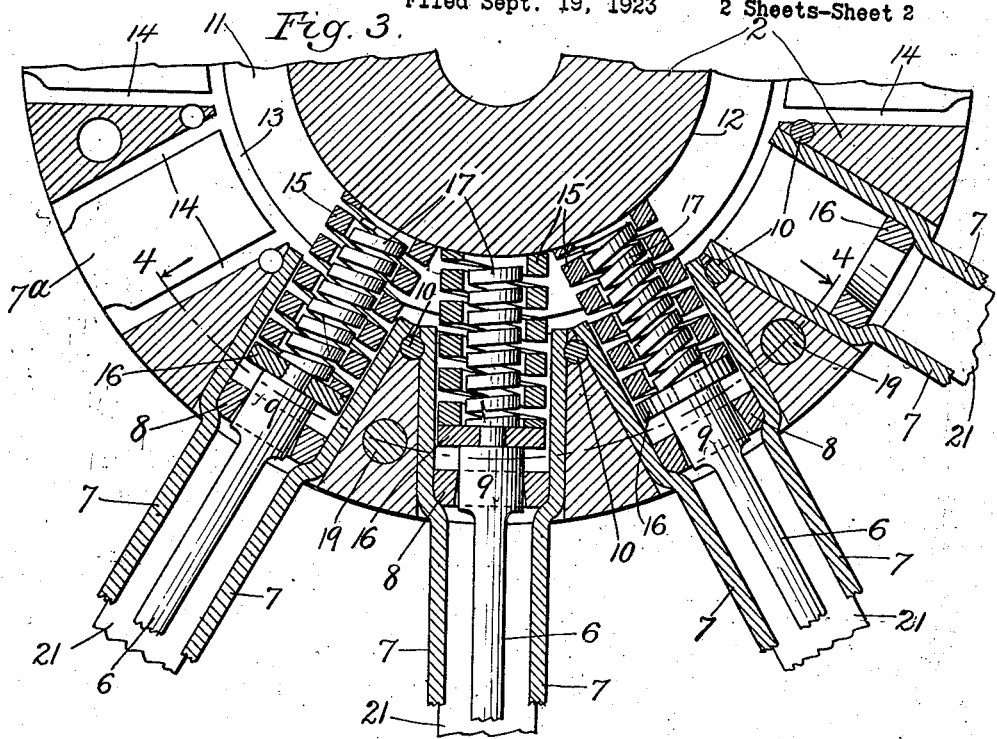
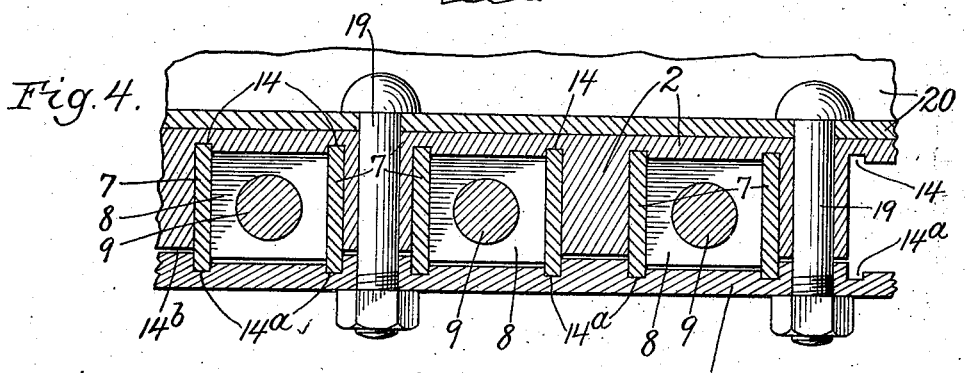
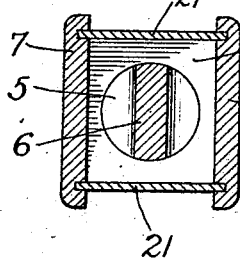 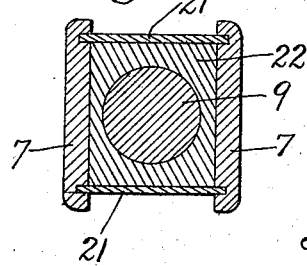
Inventor  
John R. Eaid.  
by Parker & Carter  
Attorneys Patented Feb. 15, 1927.

1,617,442

UNITED STATES PATENT OFFICE.

JOHN R. EAID, OF CHICAGO, ILLINOIS, ASSIGNOR TO THE PEOPLES TRUST AND SAVINGS BANK OF CHICAGO, TRUSTEE.

WHEEL.

Application filed September 19, 1923. Serial No. 663,546.

This invention relates to improvements in wheels and has for its object to provide a new and improved device of this description. One of the objects of the invention is to provide a strong, durable, quick acting and efficient elastic wheel. Another object of the invention is to provide certain improved details of construction. The invention has other objects which are more particularly pointed out in the following description.

Referring now to the drawings:

Fig. 1 is a view of one form of wheel embodying the invention;

Fig. 2 is a sectional view taken on line 2—2 of Fig. 1;

Fig. 3 is a sectional view taken on line 3—3 of Fig. 2;

Fig. 4 is a sectional view taken on line 4—4 of Fig. 3;

Fig. 5 is a sectional view taken on line 5—5 of Fig. 1;

Fig. 6 is a sectional view taken on line 6—6 of Fig. 1.

Like numerals refer to like parts throughout the several figures.

Referring now to the drawings, I have illustrated a wheel having an outer rim 1 and a hub 2. The rim is provided with a tire holding part 3 of the ordinary kind which holds the tire 4 which is preferably a solid rubber tire. Fastened to the rim 1 are a series of spokes 5. The middle portion 6 of each spoke is flat so as to secure a spring effect. The end portions are preferably round so as to permit longitudinal movement in suitable guides. Each spoke is inclosed in an inclosing device throughout a greater portion of its length. As herein shown, each inclosing device is made up of two strong, flat pieces 7 which are fastened to the hub 2 and which project outwardly from the hub to a point near the rim 1, there being a sufficient space between the ends thereof and the rim 1 to permit the necessary movement of the parts. These flat pieces also have a spring effect when the wheel is in operation. The hub is provided with a square, radial opening $7^a$ into which the flat pieces 7 project (see Figs. 3 and 4). Located between these pieces is a guide 8 for the inner round portion of the spoke, this guide being fastened to the flat pieces 7 by welding or otherwise so as to be held in place and so as to spread the flat pieces apart and hold them in this position. These flat pieces may be held from longitudinal movement by means of the pins 10 in the hub 2 such pins projecting partly into grooves in the flat pieces (see Fig. 3) so as to hold them against longitudinal movement. The hub is provided with a circumferential groove 11 (see Figs. 2 and 3) so as to form a shoulder 12 on the hub and the square radial openings $7^a$ for the members 7 connect with this groove as shown in Fig. 3. At the outer edge of the groove 11 is a small deeper groove 13 with which communicate the grooves 14 into which the edges of the flat pieces or members 7 are received. This groove 13 facilitates the making the grooves 14 (see Figs. 3 and 4). Located between the inner ends of the members 7 are the coil springs 15 which are located between the shoulder 12 on the hub and the ends of the spokes 5. In the construction shown the ends 9 of the spokes 5 have attached thereto the pieces 16 (see Fig. 3). These pieces are wider than the diameter of the spokes so as to permit the springs to be subjected to pressure at all times and permit the end pieces 9 of the spokes to reciprocate in the guides 8. I prefer to provide on the interior of the springs 15 other springs 17. One of the springs either 15 or 17 is preferably shorter than the other so that one spring will first take the load and as the load reaches a predetermined amount the other spring will be brought into action. In the construction shown in Fig. 3 the inner springs 17 are shown as shorter than the outer springs 15. The radial openings $7^a$ extend to the face of the hub so that the parts can be inserted laterally and the parts are then held in place by the plate 18 which is fastened to the hub by suitable fastening devices, as for example, the bolts 19. These bolts may also be used to fasten the brake drum 20 to the hub. The plate 18 is also provided with the grooves $14^a$ for the edges of the pieces 7 and I prefer to provide a space $14^b$ between the plate 18 and the hub 2 so that when the bolts 19 are tightened up, the plate 18 presses upon the pieces 7 and clamps them in place.

The openings in the spoke inclosing device may be closed in any desired manner. As herein shown they are closed by the comparatively thin closure plates 21 (see Figs. 2, 5 and 6). These plates are arranged so as not to interfere with the elasticity of the spokes and the inclosed flat pieces 7. The pieces 7, as shown, are provided with grooves into which the closure pieces 21 fit. At the outer ends of the pieces 7 is another guide 22 which is welded or otherwise fastened to the pieces 7 which acts as a guide for the outer end of the spoke 6 (see Figs. 2, 5 and 6). As illustrated in Fig. 3, the inner ends of the pieces 7 are bent away from each other so that the distance between them is greater than the distance between the portions thereof at their outer ends. The wheel is adapted to be used on vehicles of various kinds. When the wheels are used on automobiles, for example, and are used as the driving wheels, the driving power is applied to the axle 24 and under these conditions, when the wheel strikes an obstacle, the axle and the hub tend to move forward faster than the rim due to the elasticity of the wheel and then the entire wheel moves over the obstacle. When two of the wheels are driven, for example, this action occurs on all the wheels and breaks the force of the blow and takes up the jar. In the ordinary operation of the wheel, the hub and the rim move relatively, the spokes compressing the springs 15, and when the load warrants it, the springs 17, such spokes moving in the guides 8 and 22 thus taking up the jar and causing the smooth traveling of the vehicle. When the springs are under pressure and the shock is relieved, the wheel comes back so quickly that it reduces the torque of the engine on the spokes. The compression of the springs in the hub reduces the circumferential movement of the spokes and the springs under pressure and the side springs take up the side motion. The movement due to the springs is relatively small because I prefer to have the springs compressed highly under pressure, say about two hundred pounds. This construction also takes out the vibration.

I have described in detail a particular construction embodying the invention but it is of course evident that the parts may be varied in many particulars without departing from the spirit of the invention as embodied in the claims hereto appended, and I, therefore, do not limit myself to the particular construction shown.

I claim:

1. A wheel comprising a rim, a series of spokes fastened to said rim, a hub, two separated flat inclosing devices for each of said spokes, said inclosing devices fastened to said hub, and projecting outwardly, their ends being separated by a space from said rim, separated guiding devices connected with the inclosing devices and through which the spoke passes, a spring between the inner ends of said inclosing devices, an enlarged device on the spoke opposed to said spring.

2. A wheel comprising a rim, a series of spokes fastened to said rim, a hub, two separated flat inclosing devices for each of said spokes, said inclosing devices fastened to said hub, and projecting outwardly, their ends being separated by a space from said rim, separated guiding devices connected with the inclosing devices and through which the spoke passes, a spring between the inner ends of said inclosing devices, an enlarged device on the spoke opposed to said spring and closure pieces on opposite sides of said spokes opposed to the edges of said inclosing pieces.

3. A wheel comprising a rim, a series of spokes fastened to said rim, a hub, two separated flat inclosing devices for each of said spokes, said inclosing devices fastened to said hub, and projecting outwardly, their ends being separated by a space from said rim, separated guiding devices connected with the inclosing devices and through which the spoke passes, a spring between the inner ends of said inclosing devices, an enlarged device on the spoke opposed to said spring, a second spring associated with the first mentioned spring, one of said springs adapted to be brought into action if the other spring has been compressed a predetermined amount.

4. A wheel comprising a rim, a series of spokes fastened to said rim, a hub, two separated flat inclosing devices for each of said spokes, said inclosing devices fastened to said hub, and projecting outwardly, their ends being separated by a space from said rim, separated guiding devices connected with the inclosing devices and through which the spoke passes, a spring between the inner ends of said inclosing devices, an enlarged device on the spoke opposed to said spring, each spoke flattened for a portion of its length between its ends, the spokes and the inclosing pieces having a spring action.

5. A wheel comprising a rim, a series of spokes fastened to said rim, a hub, flat inclosing pieces connected to said hub and projecting outwardly on opposite sides of each spoke and extending only part way along said spokes, said hub being provided with square holes into which the inner ends of said flat inclosing pieces project, means for locking said inner ends to the hub, said hub being provided with a groove on the inner side of the ends of said inclosing pieces so as to form a shoulder, a spring associated with each spoke and located between its inclosing pieces, one end of the spring opposed to said shoulder and the other end opposed to the spoke and separated guiding devices connected with said inclosing pieces which hold the spoke substantially centrally between the enclosing devices.

6. A wheel comprising a rim, a series of spokes fastened to said rim, a hub, flat enclosing pieces connected with said hub and projecting outwardly on opposite sides of each spoke and extending only part way along said spokes, said hub being provided with square holes into which the inner ends of said flat enclosing pieces project, means for locking said inner ends to the hub, said hub being provided with a groove on the inner side of the ends of said enclosing pieces so as to form a shoulder, a spring associated with each spoke, one end of the spring opposed to said shoulder and the other end opposed to the spoke and separated guiding devices connected with said enclosing pieces which hold the spoke substantially centrally between the enclosing devices, the spokes flattened for a portion of their length, said spokes and enclosing pieces acting as spring members.

7. A wheel comprising a hub provided with a circumferential groove, a shoulder at the bottom of said groove, said hub provided with a series of holes, springs opposed to said shoulder and projecting into said holes, a rim, spokes connected with said rim and opposed to said springs, separate enclosing devices on opposite sides of each spoke and projecting into the openings in the hub and part way along said springs and means for removably fastening said enclosing devices to said hub.

8. A wheel comprising a hub, a series of radial holes in said hub, two springs in each of said holes, a rim, spokes connected with said rim, guiding devices for said spokes, said spokes adapted to compress said springs, the two springs associated with each spoke arranged so that one spring comes into action if the other spring has been compressed a predetermined amount.

9. A wheel comprising a rim, spokes connected with said rim, a hub, a series of springs in said hub, two of said springs associated with each spoke and being in alignment therewith, the spokes adapted to compress said springs, one of the springs associated with each spoke adapted to be brought into action if the other spring has been compressed a predetermined amount.

Signed at Chicago, county of Cook and State of Illinois, this 1st day of September, 1923.

JOHN R. EAID.